Jan. 17, 1967 R. ROGER 3,299,209

ACTUATING STRUCTURE FOR CONTROLLING A TELEPHONE SWITCH BUTTON

Filed Jan. 13, 1964 3 Sheets-Sheet 1

INVENTOR.
Raúl Roger
BY Brown Jackson
Boettcher + Dienner
Attys.

ACTUATING STRUCTURE FOR CONTROLLING A TELEPHONE SWITCH BUTTON

Filed Jan. 13, 1964 3 Sheets-Sheet 2

INVENTOR.
Raúl Roger
BY Brown Jackson
Boettcher & Dienner
Attys.

ACTUATING STRUCTURE FOR CONTROLLING A TELEPHONE SWITCH BUTTON

Filed Jan. 13, 1964

INVENTOR.
Raül Roger
BY Brown Jackson
Boettcher & Dienner
Att'ys.

United States Patent Office 3,299,209
Patented Jan. 17, 1967

3,299,209

ACTUATING STRUCTURE FOR CONTROLLING A TELEPHONE SWITCH BUTTON

Raul Roger, 2124 Jose Cabas St., Buenos Aires, Argentina

Filed Jan. 13, 1964, Ser. No. 337,367
5 Claims. (Cl. 179—1)

This invention relates to an automatic telephone message recording device adapted to be detachably mounted on the handset cradle of a telephone set.

The main object of the present invention is to provide an automatic telephone message recording device capable of being applied onto a telephone set without affecting the electromagnetic circuit thereof.

A still further object of the invention is to provide a device of the aforesaid type which will operate independently of said telephone electromagnetic circuit, since the setting in operation thereof simply requires resting the recording device box on the upper ends of the handset cradle arms of the telephone set.

The device of this invention, therefore, has no part thereof connected to the telephone electromagnetic circuit which might alter the normal operating conditions thereof. When the user leaves his office or home and wishes to have any incoming telephone messages recorded, it will only be necessary to place the device on the handset cradle, after having removed the handset which he will place on a table or the like, in a position to be described hereinafter.

The time during which each message will be recorded by the device is preferably regulated to cover a period of not more than 3 to 4 minutes, at the end of which the communication will be interrupted and the device will be ready to receive and record a further message.

The parties wishing to have the transmitted messages recorded will be informed that the messages are being normally picked up by the device by means of a sound generating device, the sound generated thereby being audible through the telephone line.

The device includes, electrically connected therewith, a coil the winding of which is electrically connected with one of the device components and constituting a means for picking up amplified signals at the time of starting the transmission of a message, a sound generating device for indicating that the message is being picked up by the device, and a clock or timer for regulating the time during which the message will be recorded and also acting as a means for energizing an electromagnet ending the communication between the calling and called telephones.

In accordance with one embodiment of the invention, the device comprises an upright member having an enlarged lower end adapted to bear freely on the head of the member actuating the switch forming a part of the telephone set electric circuit; a plate slidably associated with the upright member intermediate the ends thereof, as a means for holding said member in raised position relative to said switch-actuating head; a first electromagnet within the magnetic field of which the upper end of said upright member is located, and serving as a means for transmitting upward impulses thereto; a second electromagnet having the corresponding end of said plate within the magnetic field thereof; a second plate fixed to the upright member at a point upwardly of said first plate and provided with a notch affording free access to said upright member; a coil constituting the means for picking up amplified signals at the beginning of the transmission of a message, said coil being connected in circuit with said first electromagnet to which there is connected in circuit a buzzer constituting the sound generator; a clock or timer and a recording mechanism; the device including a box wherein the components of the device are housed.

In accordance with a second embodiment of the invention, the means for governing the linear movements of the telephone set switch-actuating member comprises an arcuate member oscillatingly suspended from the inner face of the top wall of the device box and terminating at one end in an enlarged end forming a counter-weight. A bent arm extending from said counterweight is disposed within the magnetic field of one of the electromagnets. The opposite end of the arcuate member extends in the form of an arm to the free end of which there is articulated a plate located on a place above that defined by the head of the switch-actuating member. The weight of the counterweight is made slightly lower than that of the plate, so as to hold the arcuate member balanced and thus facilitate the operation of the device.

Also in accordance with this second embodiment of the invention, the device comprises, as a means for informing the calling party that the message is being picked up for recording, a modulated sound transmitting electromagnetic tape or wire capable of informing the calling party that he has been connected with the right number.

In order that the invention may be more clearly understood and readily carried into practice, two of the preferred embodiments thereof have been illustrated by way of example in the accompanying drawings, wherein.

Figure 1:
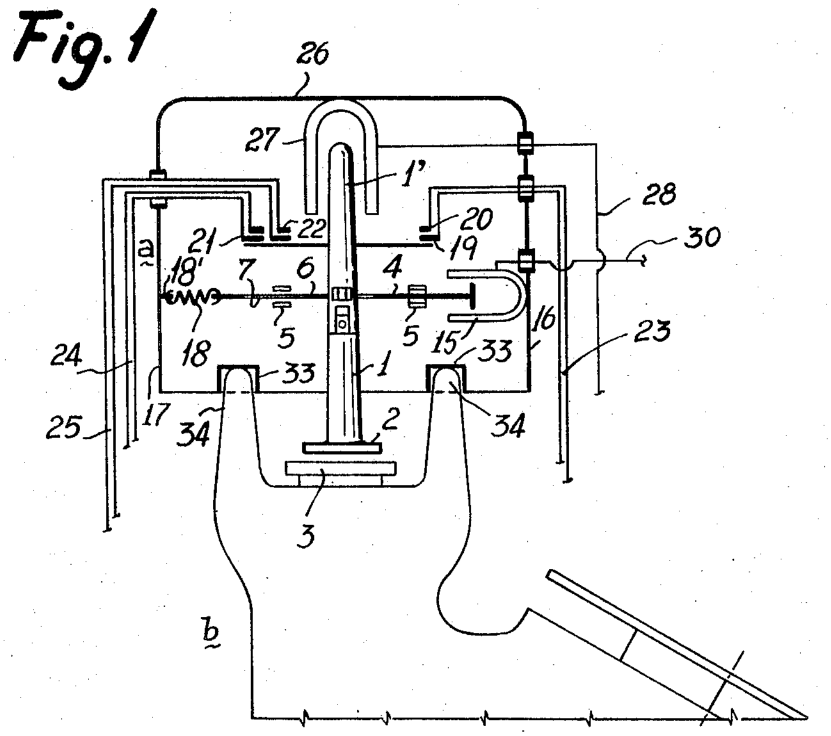
FIG. 1 is a fragmentary elevational view, partly in section, of a device in accordance with the invention, with the holding box shown in section and mounted on a telephone set.

Referring first to FIGS. 1 to 4 inclusive, the automatic telephone message recording device in accordance with the present invention comprises a box *a* housing therein an upright member 1 having an enlarged lower end 2 adapted to bear freely on the switch button 3 forming a part of the usual electromagnetic device in the telephone set *b*. The upright member 1 has slidably associated therewith intermediate the ends thereof, a phate 4 which is slidable between guide members 5.

The plate 4 is formed with a notch 6 parallel to its longitudinal axis, said notch 6 communicating with an opening 7 also formed in said plate. The notch 6 constitutes the zone supporting the upright member 1 in raised position, through the interposition to the upper face of said plate 4 of a set of lateral wing-like members 8 articulated at one end to said upright member 1 so as to collapse during the upward linear movement thereof, as shown in FIG. 3.

Figures 2, 3:
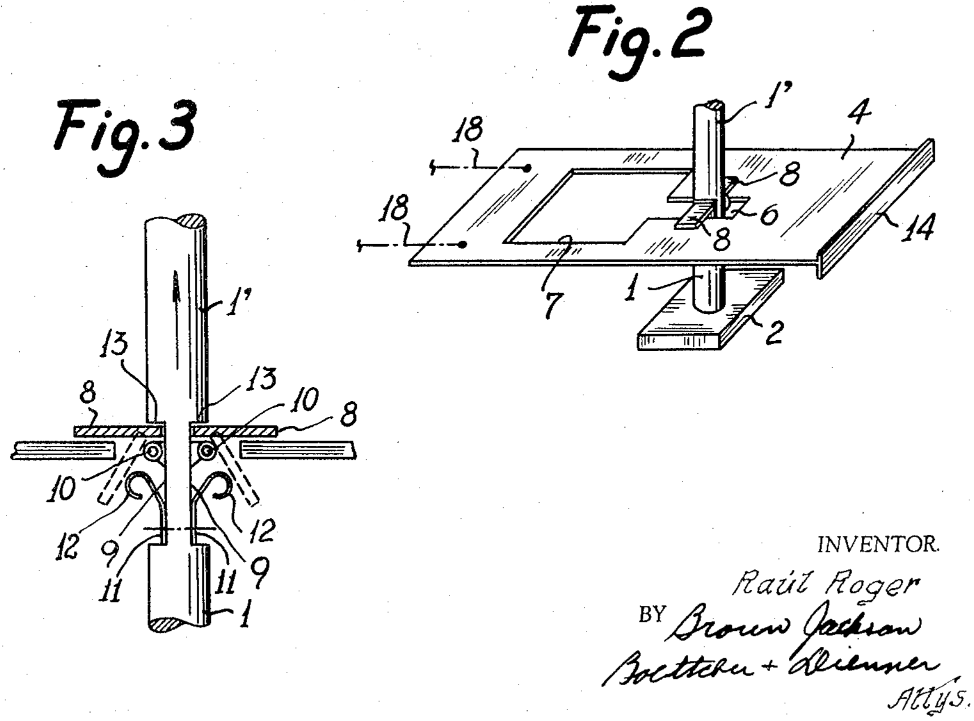
FIG. 2 is a prespective view of two of the components of the device shown in FIG. 1.
FIG. 3 is an elevational, partly sectional view of the components shown in FIG. 2.

As shown in FIG. 3, the wing like members 8 have one of the ends thereof articulated to respective lateral recesses 9 in the member 1, at a point adjacent the upper ends thereof, by means of a hinge connection 10. The opposite or lower ends of said recesses 9 have fixed thereto corresponding leaf springs 11 having an upper angular portion diverging from said recesses and terminating in loop end portions 12, for limiting the angular movement of the wing-like members 8 towards the collapsed position. The angular movement of the members 8 is from the normally collapsed position shown in dashed lines in FIGURE 3 to the extended horizontal position shown in full lines and determined by the upper faces of said wing-like members engaging respective upper shoulders 13 formed by said recesses 9.

One of the ends of the plate 4 carries a transverse flat rod 14 of paramagnetic material, located within the magnetic field of an electromagnet 15 fixed to the inner face of the side wall 16 of box *a*. Extending from the opposite box side wall 17 there is provided a pair of coil springs 18, each having one end anchored to a respective anchoring member 18' fixed to said wall 17, the opposite ends of the springs being anchored to the end of the plate 4 opposite to that carrying the flat rod 14, at points near the longitudinal edges of the plate. The springs 18 constitute means for transmitting linear impulses to said plate 4 in a direction away from the electromagnet 15.

At a level above the plate 4, said upright member 1 carries a second plate 19 fixed thereto and vertically movable therewith. Suitably spaced above the plate 19 and within the path of upward movement thereof, there are three pairs of contacts 20, 21 and 22, each pair forming the terminals of both wires of a respective line 23, 24 and 25, the line 23 corresponding to the buzzer *c*; the line 24 corresponding to the clock or timer *d* and the line 25 corresponding to the recording mechanism *e*, as shown in the diagram of FIG. 4.

Fixed to the inner face of the top wall 26 of the box *a* is an electromagnet 27, the upper portion 1' of the upright member 1, which is made of paramagnetic material, being located within the magnetic field of said electromagnet 27. A conductor 28 extends from the electromagnet 27 to a coil *f*, as shown in FIG. 4, said coil constituting the means foı picking up amplifying signals at the beginning of the transmission of a message and being adapted to be placed between the underface of the telephone set *b* and the surface supporting same. The conductor 28 is connected to the electric current supply by means of a conductor 29.

The electromagnet 15 is electrically connected to a clock or timer mechanism *d* by means of a conductor 30, the circuit being completed by the branches 31 and 32 connecting the clock or timer mechanism *d* with the buzzer *c* and the recording mechanism *e*, respectively, for opening the circuit between said elements once they have performed their operation, since the buzzer ceases to operate after about 15 seconds, while the clock or timer and the recording mechanism cease after a period of 3–4 minutes corresponding to the end of the transmission of a message.

Figure 4:
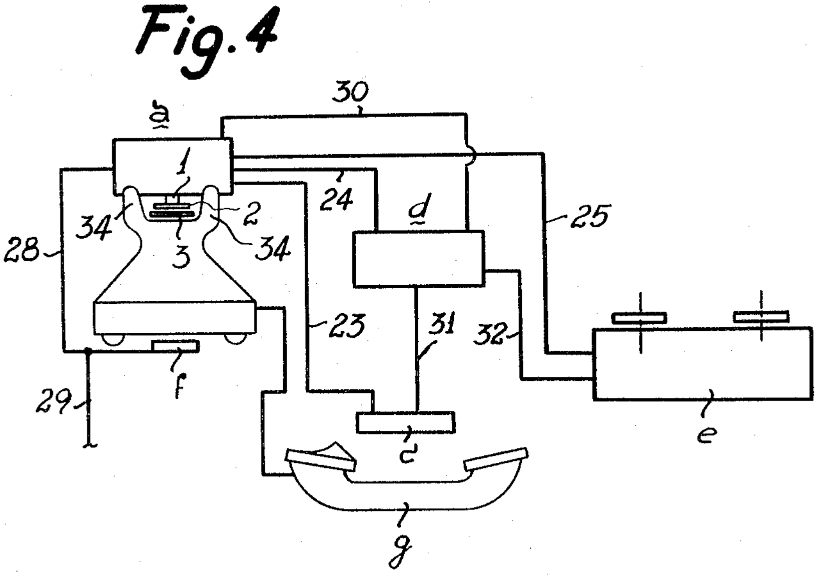
FIG. 4 is a diagrammatic elevational representation of the device and the connection thereto of a buzzer, clock or timer, coil and recording mechanism.

The bottom of the box *a* is provided with channelled members 33 engageable by the upper ends of the arms 34 forming a part of the cradle for the handset *g* shown in FIG. 4.

The operation of the device is as follows: the handset *g* is removed from the cradle and the box *a* seated on the arms 34, with the enlarged lower end 2 of the upright member 1 seated against the switch button 3 forming part of the telephone set electromagnetic circuit, thereby remaining in operative position; in turn, the handset *g* is placed close to the buzzer *c*. An incoming call signal will be picked up and amplified by coil *f*, the latter energizing the electromagnet 27 by means of which the upright member 1 is raised, the plate 19 thereof closing the circuit to the buzzer *c*, the timer *d* and the recording mechanism *e*.

As the upright member 1 is raised on being attracted by the electromagnet 27, the wing-like members 8 which were in their partly collapsed positions bearing against the upper diverging portions 12 of the spring members 11, shown in dash lines in FIGURE 3, will be further collapsed against the action of the divergent spring portions as the wing-like members 8 engage the edge portions of notch 6 to thereby allow them to pass upwardly through the notch 6. After the wing-like members 8 pass through the notch 6, the free end portions will be biased outwardly to overlie the upper surface of the plate 4 at opposite sides of the notch 6. Thus, the subsequent de-energization of the electromagnet 27 will cause the upright member 1 to drop by gravity, but only to the extent permitted by the wing-like members 8 engaging flatly the upper surface of plate 4, as shown in full lines in FIGURE 3, thereby preventing the enlarged lower end 2 of upright member 1 from engaging the telephone switch button 3 and opening the telephone circuit.

As the line circuit is closed through the conductor 29, the coil *f* will cause the closing of the circuit energizing the electromagnet 27, thereby generating therein a magnetic field which will attract the plate 19, thus closing the electric circuit between the device, the buzzer *c*, the timer *d* and the recording mechanism *e*; this will connect the ends of the line between the calling and the called parties, whereupon the buzzer *c* will start operating, the sound thereof being audible to the calling party who will thus be informed that the message is being picked up by the called telephone. At the end of the reception and subsequent recording of a message, the timer *d*, which may be of any suitable construction and forms no part of this invention, will switch off the recording mechanism *e* and excite the electromagnet 15. Overcoming the resistance of the springs 18, the electromagnet 15 will attract the plate 4 and move it to the right, looking at FIGURE 2, until the upright member 1 and the wing-like members 8 enter the opening 7 and are thus allowed to drop by gravity onto the switch button 3, which will in turn be lowered by the member 1 so as to open the telephone circuit and leave it ready for a further call, the opening of the telephone circuit also de-energizing the electromagnet 15, whereupon the plate 4 will assume its normal position with the wing-like members 8 aligned with the notch 6.

With reference to the modified embodiment of the invention as illustrated in FIGS. 5 to 9 inclusive, the box *a* is shown as provided on the bottom wall thereof with channel-shaped members 101 adapted to receive the upper ends of the arms 102 of the cradle supporting the handset *g* of the telephone set *b*.

Suspended from the inner face of the top wall 103 of the box *a* there is provided an arcuate member *h* (see FIG. 5) of diamagnetic material. The arcuate member *h* is mounted so as to freely oscillate angularly from left to right and vice-versa, by means of a pin 104 inserted into a forked tab 105 extending from the upper face of the arcuate member and passing through a support or hanger 106 extending from the inner face of the top wall 103, said arcuate member *h* controlling the upward and downward movements of the member 107 actuating the usual telephone set electromagnetic circuit switch.

One end of the arcuate member *h* terminates in an enlarged end portion 108 forming a counterweight (FIG. 1) from which extends a bent arm 109 of paramagnetic material, positioned within the magnetic field of an electromagnet *i*. The other end of the arcuate member *h* extends in the form of an arm 110 angularly directed and converging to a central tab 111 extending upwardly from the upper face of a plate 112 and to which said arm 110 is articulated by means of a pin 113, said plate 112 constituting the means for actuating the aforesaid member 107.

The weight of the terminal member 108 is slightly lighter than the weight of the plate 112 so as to maintain the arcuate member *h* balanced and to impart thereto the required sensibility for its oscillating movement at the beginning of the transmission of a message.

A horizontal arm 114 extends from a point on the outer face of the arcuate member *h* near its articulation to the hanger 106 (FIG. 5) and spaced from said horizontal arm 114 there is a series of three movable contacts 115, 116 and 117 which are in turn closely spaced from corresponding fixed contacts 118, 119 and 120 forming the terminals of the respective conductors 121, 122 and 123 to be referred to hereinafter, together with a conductor 124 connected to the induction winding of the electromagnet *i*.

Figure 5:
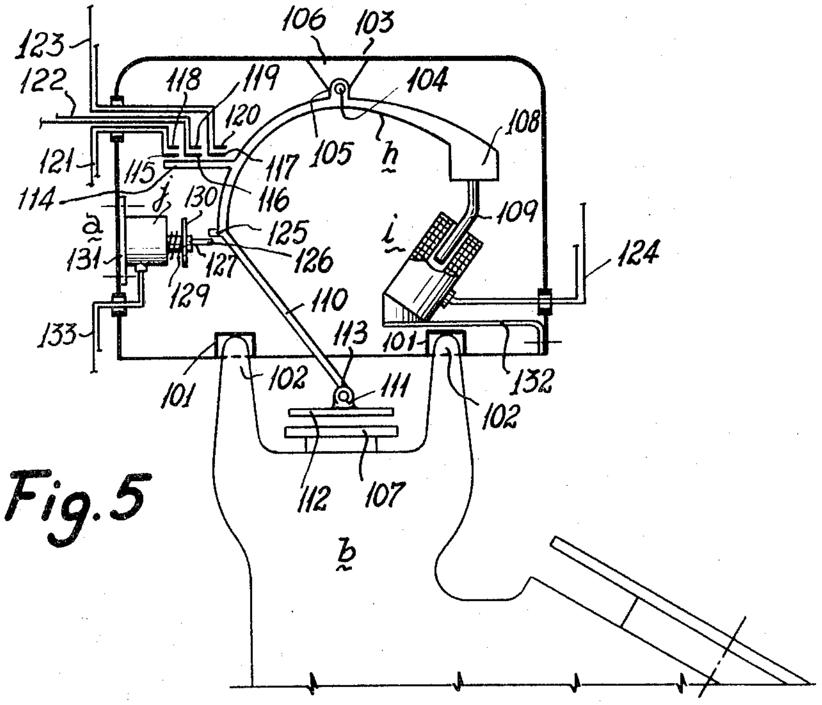
FIG. 5 is a partly sectional elevation of a device in accordance with a modified embodiment of the invention.
Figure 6:
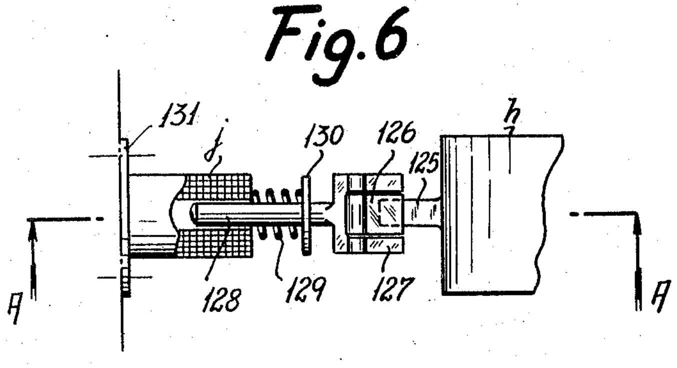
FIG. 6 is an enlarged fragmentary plan view of a portion of the device shown in FIG. 5.
Figure 7:
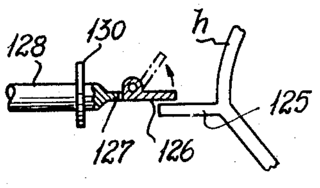
FIG. 7 is a cross-sectional view taken along the line A—A in FIG. 6.

Continuing with the arcuate member *h*, at a point of the outer face thereof from which the arm 110 extends, there is provided an integral ear 125 (FIGS. 5 and 6). Spaced from the undersurface of said ear 125 there is provided a plate 126 articulated to a mounting member 127, said articulation being established so as to limit the downward angular movements of said plate. The mounting member 127 is fixed to one end of a stem 128 of paramagnetic material projecting from the induction winding of a second electromagnet *j*, said stem 128 being urged outwardly by a coil expansion spring 129 inserted between said electromagnet and a plate 130 fixed to a point on said stem near the end to which the mounting member 127 is fixed. The electromagnet *j* is fixed by means of a flange 131 to the inner wall of the box *a* opposite to that adjacent which the electromagnet *i* is fixed to a support 132 which is in turn fixed to the lower marginal zone of the inner surface of said wall.

A conductor 133, to be described hereinafter, extends from the induction winding of said electromagnet *j*.

Figure 8:
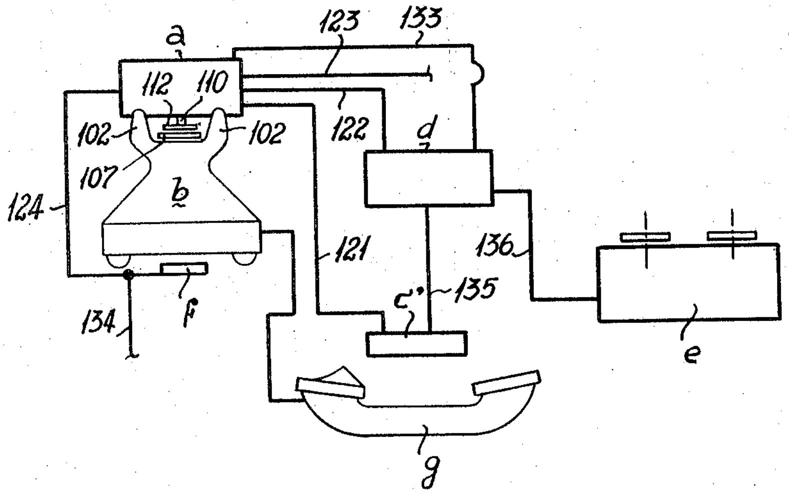
FIG. 8 is a diagrammatic view similar to FIG. 4 and showing the electrical connection to the device of FIGS. 5 to 7 of the several members governing the transmission of a message to the recorder, and also of said recorder.

As described in connection with FIGS. 1 to 4, the device is adapted for connection in circuit with the coil *f*, FIG. 8, picking up the amplified signals at the beginning of the transmission of a message, said coil being placed underneath the telephone set *b*, the clock or timer *d*, a device *c'* generating modulated signals and capable of replacing the buzzer *c* when using transistorized recording devices. If valved recording devices are used, the buzzer will be inserted in circuit, which in this case will act as a means for heating the valves, and the recording mechanism *e*, said device *c'* being positioned at a point near the handset *g* through which the sounds are transmitted to the set of the calling party.

The connection in electromagnetic circuit of the elements mentioned in the preceding paragraph is established as follows: the conductor 121 is connected to the modulated sound generating device *c'*; conductor 122 to the clock or timer *d*; the conductor 123 will eventually be connected to a buzzer inserted in the circuit, while conductor 121 would be connected to the device *c'*, and conductor 122 to the clock or timer *d* which would act as a means for later cutting off said device and place the recording device *e* ready to record the messages. The conductor 124 is connected to the coil *f*, a branch 134 being connected to said conductor 124 for connecting the device to the supply line, the electric circuit being completed by the branches 135 and 136 leading from the clock or timer *d* to the device *c'* and to the recording mechanism *e*, respectively.

Figure 9:
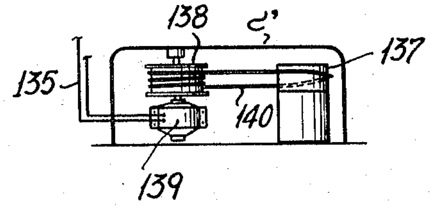
FIG. 9 is an elevational view showing the modulated sound generating device.

The device *c'* is of the conventional type including a head 137 and a reel 138, FIG. 9, driven by a micromotor 139 to which the conductor 135 is connected, and a magnetic wire or tape 139 which is wound on, or unwound from, said reel past said head. This device is adapted for coupling to the recording mechanism *e*, although it is shown as a separate unit in FIG. 8, the assembly being in such case connected to the amplifier and loudspeaker of the recording device so as to transmit to the calling party a message indicating that he has been connected with the right number and that the message will be recorded automatically during a period of 3–4 minutes.

The operation of the device as illustrated in FIGS. 5 to 9 is similar to that explained in connection with the embodiment of FIGS. 1 to 4 and, therefore, needs not be repeated.

While a specific example of the invention has been described and illustrated, it is obvious that many changes and/or modifications will occur to those skilled in the art, without departing from the spirit and scope of the invention as clearly set forth in the appended claims.

What is claimed is:

1. Actuating structure in a message recording device for controlling a telephone switch button, comprising a box adapted to be seated on a telephone handset cradle, an upright member in said box having an enlarged lower end portion propecting from the bottom thereof and capable of being freely seated on said telephone switch button, a first plate member slidably associated with said upright member at a position intermediate the ends thereof, means in said first plate member and said upright member for releasably supporting said upright member in a raised position relative to said telephone switch button, a first electromagnet mounted on the inner top wall of said box in alignment with said upright member, the upper end portion of said upright member being positioned within the magnetic field thereof, a second electromagnet mounted on an inner side wall of said box and aligned with said first plate member, one end of said first plate member being positioned within the magnetic field of said second electromagnet, a second plate member fixed to said upright member at a position above said first plate member and having contact members on the upper face thereof, and fixed contact members aligned with and normally spaced upwardly from said second plate contact members.

2. Actuating structure as claimed in claim 1 wherein said first plate member is provided with a notch communicating with an opening through which said upright member extends and spring means normally urging said first plate member away from said second electromagnet and against the lines of force of the magnetic field thereof.

3. Actuating structure as claimed in claim 1 wherein said means for releasably supporting said upright member in raised position comprises a pair of collapsible winglike members hinged to opposite sides of said upright member and capable of bearing on the upper face of said first plate member at opposite sides of a notch formed therein.

4. Actuating structure in a message recording device for controlling a telephone switch button, comprising a box adapted to be seated on a telephone handset cradle, an arcuate member in said box depending from the top wall thereof and freely oscillatable from right to left and vice versa, one end of said arcuate member being enlarged and forming a counterweight, an arm member extending from said counterweight into the field of attraction of an electromagnet mounted in said box, the other end of said arcuate member extending in the form of an arm articulated to the upper face of a plate member located above said telephone switch button, said arcuate member having a horizontal arm member, movable contact members on said horizontal arm member capable of engaging fixed contact members in said box, means for oscillating said arcuate member, and means for releasably holding said arcuate member in an oscillated position.

5. Actuating structure as claimed in claim 4 wherein said means for releasably holding said arcuate member in an oscillated position comprises a projection located below said horizontal arm member, said projection being engageable with a locking means for holding said arcuate member plate in raised position relative to said switch button.

References Cited by the Examiner

UNITED STATES PATENTS 2,935,566 5/1960 Karl ---------------- 179—6

JAMES W. MOFFIT, *Acting Primary Examiner.*

IRVING SRAGOW, *Examiner.*

G. LIEBERSTEIN, *Assistant Examiner.*